United States Patent [19]

Suzuki et al.

[11] Patent Number: 4,877,717
[45] Date of Patent: Oct. 31, 1989

[54] PROCESS FOR THE PRODUCTION OF OPTICAL ELEMENTS

[75] Inventors: Toshihiro Suzuki, Kawasaki; Yasuyuki Todokoro; Kazunari Komenou, both of Atsugi, all of Japan

[73] Assignee: Fujitsu Limited, Kawasaki, Japan

[21] Appl. No.: 77,337

[22] Filed: Jul. 24, 1987

[30] Foreign Application Priority Data

| Jul. 26, 1986 | [JP] | Japan | 61-174719 |
| Aug. 28, 1986 | [JP] | Japan | 61-200102 |
| Sep. 19, 1986 | [JP] | Japan | 61-219782 |
| Sep. 19, 1986 | [JP] | Japan | 61-219785 |
| Mar. 19, 1987 | [JP] | Japan | 62-062426 |

[51] Int. Cl.$^4$ ............... B29D 11/00; G02B 1/04; G03C 1/68
[52] U.S. Cl. ............... 430/321; 350/167; 350/417
[58] Field of Search ............... 350/167, 417; 430/321, 430/322

[56] References Cited

U.S. PATENT DOCUMENTS

| 2,876,099 | 3/1959 | Schenk | 350/167 |
| 3,733,976 | 5/1973 | Dietch | 350/167 |
| 4,229,520 | 10/1980 | Bratt et al. | 430/322 |
| 4,523,807 | 6/1985 | Suzuki | 350/167 X |

FOREIGN PATENT DOCUMENTS 57-53702  3/1982  Japan ............... 350/417

Primary Examiner—Bruce Y. Arnold
Assistant Examiner—David J. Edmondson
Attorney, Agent, or Firm—Staas & Halsey

[57] ABSTRACT

A process for the production of optical elements which comprises forming on a substrate a light-sensitive film containing at least a photoreactive compound, and selectively exposing the film to radiation to cause migration of the unreacted compound from an unexposed area to an exposed area by the exposure. The present process is particularly useful in the low-cost mass-production of various micronized optical elements such as plastic microlenses and arrays thereof, optical waveguides, diffraction gratings, and holograms, for example. An optical device comprising the optical elements of the present invention is also disclosed.

24 Claims, 18 Drawing Sheets

PROCESS FOR THE PRODUCTION OF OPTICAL ELEMENTS

BACKGROUND OF THE INVENTION

1. Field of the Invention

The present invention relates to a process for the production of an optical element such as a lens, gradient thickness film, or the like. More particularly, the present invention relates to a process for the production of plastic microlenses and the arrays thereof, optical waveguides, diffraction gratings, holograms, and the like. The present invention also relates to an optical device using the optical element of the present invention.

Microlenses or micro optical lenses have various uses. For example, they can be used in the ramification and combination of lights and the mixing and branching of waves in fiber optics communication, the condensation of lights in optoelectro luminescence devices and light emitting diode-sensor arrays, and as a waveguide lens for integrated optical circuits. Preferably, these microlenses, etc., have a short focal length, when used for the above purposes. Further, optical waveguides and diffraction gratings should show a negligible optical transmission loss and a good difraction efficiency, respectively.

2. Description of the Related Art

Hitherto, in the production of microlenses and arrays thereof made from inorganic materials or plastic materials, the following methods have been principally used:

Ion Exchange Method

This method will be described with reference to the production of a flat plate-type microlens shown in FIG. 1. As shown in the Figure, a glass substrate 10 has a mask 11 disposed thereon, and the mask 11 has a window or small opening through which a dopant 12 is diffused into the substrate 10, to increase a refractive index of the substrate 10. As illustrated in FIG. 1, the highest concentration of the introduced dopant 12 is in the area around the window of the mask, and this concentration gradually decreases with depth and in radial directions. After completion of the diffusion of the dopant, the mask 11 is removed from the substrate 10, and the substrate or lens having a desired refractive index is finally obtained, because the refractive index is in proportion to the concentration of the diffused dopant.

Suspension Polymerization Method

This method is not illustrated herein, but is useful in the production of, for example, distributed index- or gradient index-type cylindrical or spherical lenses. These lenses can be produced by the suspension polymerization of polymerizable materials, and are characterized by a continuously varied refractive index.

Electron Beam (EB) Patterning Method

The EB method is used to produce, for example, Fresnel lens arrays. This method can be carried out as shown in FIGS. 2A, 2B, and 2C. First, referring to FIG. 2A, a transparent electrically conductive coating 16, which is used to prevent an accumulation of electric charges during the EB patterning, and an EB resist coating 17 are deposited, in that order, onto a glass substrate 15. The deposited resist coating 17 is then subjected to EB exposure using an electron beam 18. As shown in FIG. 2B, the EB exposure of the resist coating 17 is carried out in such a manner that the strength of the exposure corresponds to the desired pattern of the cross-section of the Fresnel lens arrays. After the exposure is completed, the exposed resist coating 17 is developed with a developer, and Fresnel lens arrays having a cross-section shown in FIG. 2C are obtained.

Casting Method

According to this method, the lens-forming materials are introduced in a mold and cast therein. This method can be used in the production of, for example, flat convex lenses and Fresnel lenses.

However, thee prior art methods have several disadvantages. Namely, the ion exchange method is disadvantageous because it can not provide a microlens with a reduced aperture, the focal length of the lens can not be freely varied, and the resulting lens can not be laminated on other optical devices. The suspension polymerization method is not suitable in the production of lens arrays, because in this method, each lens of the arrays must be produced separately, which increases production costs. The EB patterning method suffers from drawbacks such as a large chromatic aberration, small condensing rate, lower mass-production capability, and high costs. Further, in the casting method, it is difficult to micronize the resulting lens and to integrate the same with other optical devices.

Therefore, a novel method for producing optical elements such as convex or concave microlenses and arrays thereof is needed, such a method enabling the production of elements micronized in size and capable of integration with other optical devices, on a mass production scale and at a low production cost.

In addition to the microlenses and arrays thereof, other types of optical elements such as gradient thickness films, for example, optical waveguides, diffraction gratings, and holograms have been produced using the method described above, or by other methods. The gradient thickness films or films with a distributed thickness can be produced, for example, by selectively exposing a film having a photoreactive compound uniformly dispersed therein, to produce a distribution of the reaction product of the photoreactive compound, and then annealing the coating to remove the unreacted photo-reactive compound. This method is utilized in the production of the optical waveguides. Another method is utilized in the formation of, for example, holograms. A common drawback to these prior art methods is that variations in the configuration of the film are very small, because these methods were originally intended to convert a distribution of lights or exposure intensity to a distribution of the density or refractive index of the film. Desirably, in the production of the gradient thickness films, variations in the configuration of the film are increased.

SUMMARY OF THE INVENTION

According to the present invention, there is provided a process for the production of an optical element, which comprises the steps of:
  forming on a substrate a light-sensitive film containing at least a photoreactive compound capable of causing a migration of unreacted compound from an unexposed area to an exposed area as an exposure function, thereby changing a configuration of exposed light-sensitive film, and
  selectively exposing the light-sensitive film to obtain an optical element having a desired configuration.

The optical element produced according to the present invention includes a variety of optical products such as microlenses and arrays thereof, for example, convex or concave lenses, distributed index lenses, and Fresnel lenses; optical waveguides; diffraction gratings; holograms, and the like. The type of optical products included in the term "optical element" used herein will be clarified by the following description with respect to preferred embodiments of the present invention.

According to the present invention, there is also provided an optical device which comprises a support or substrate having a shadow mask which acts to prevent visible light from go through an area of a film where no lens is, and an optical lens formed sequentially thereon.

In the optical device according to the present invention, the optical element such as a microlens or an array thereof is produced in accordance with the present process. The shadow mask is, therefore, a part or all of the photo mask used in the present process.

DESCRIPTION OF THE PREFERRED EMBODIMENTS

Figure 1:
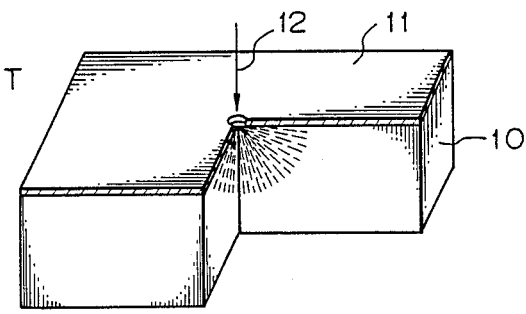
FIG. 1 is a perspective view showing a prior art method for producing a flat plate-type microlens.
Figure 2A:
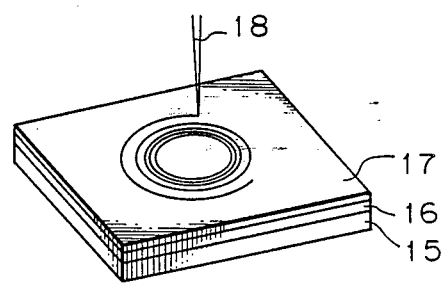
FIG. 2A is a perspective view showing another prior art method for producing Fresnel lens arrays.
Figure 2B:
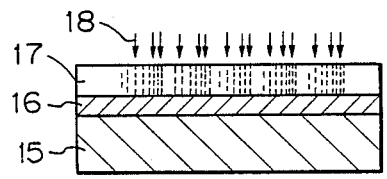
FIGS. 2B and 2C are cross-sectional views illustrating, in sequence, the method of FIG. 2A.
Figure 2C:
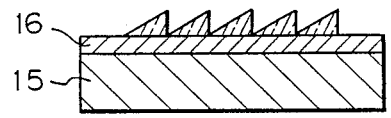

In the method of the present invention, a photo-reactive compound which exhibits a specific behavior upon exposure to radiation is added to a light-sensitive film in which the intended optical element is formed. This exposure causes substantial differences between the exposed area and the unexposed area in the melting point, diffusibility, evaporation pressure, molecular size and weight, and the like of the photoreactive compound. Subsequently, migration of the unreacted photoreactive compound from the unexposed area to the exposed area occurs, changing the configuration of the exposed area of the light-sensitive film. The microlenses are finally obtained when a surface tension and similar forces act on the exposed film.

Any photoreactive compound can be used in the practice of the presence invention, so long as the compound can produce the above-described actions. Useful photoreactive compounds are those which are capable of inducing polymerization, cross-linking, isomerization or other photoreactions. The term "polymerization" or "photopolymerization" has a broad meaning herein, and includes oligopolymerization or low-order polymerization for use in the formation of oligomers such a dimer, timer and the like, homopolymerization, copolymerization, and similar polymerizations.

Typical examples of the photoreactive compounds useful in the present invention are:

(1) Photopolymerizable Materials (1) with cyclic addition reaction

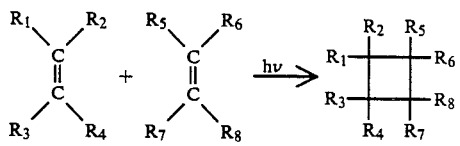

(i.) cinnamic acid and esters thereof ($R_1=R_5=$phenyl, $R_2$, $R_3=R_6$, $R_7=$hydrogen, $R_4=R_8=$COOR, R=hydrogen, alkyl, substituted alkyl and similar substituents); For example:

cinnamic acid

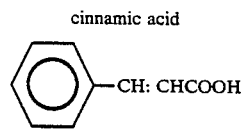

-continued methyl cinnamate
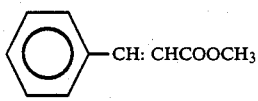

ethyl cinnamate
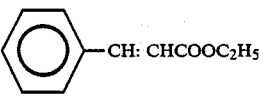

vinyl cinnamate
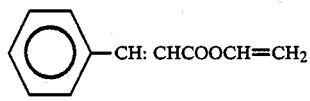

allyl cinnamate
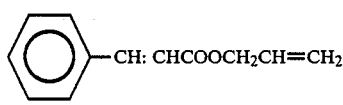

cinnamyl cinnamate
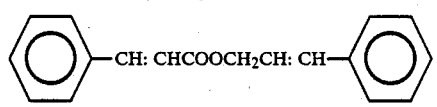

glycol cinnamate
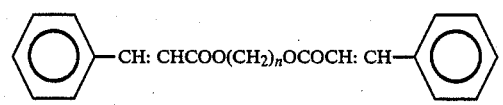

benzyl cinnamate
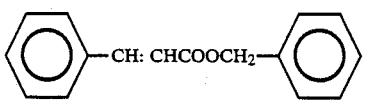

(ii.) carboxylic acid cinnamyls ($R_1=R_5=$phenyl, $R_2$, $R_3=R_6$, $R_7=$hydrogen, $R_4=R_8=CH_2OCOR$); For example:

dicarboxylic acid cinnamyl
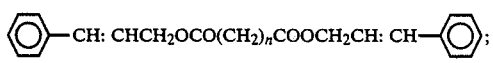

methacrylic acid cinnamyl

(iii.) others

α-methyl cinnamic acid
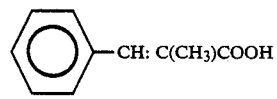

p-methyl cinnamic acid
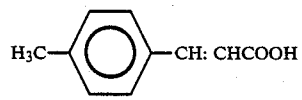

-continued cinnamyl chloride
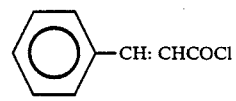

(2) with chain-like addition reaction

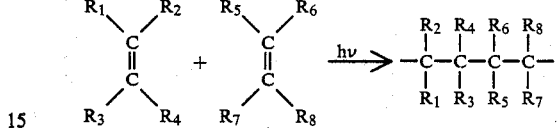

(i.) acrylic acid esters represented by $CH_2$: CHCOOR selected from epoxy-, urethane-, acryl- and amine-type esters; For example:

m-phenylene diacrylic acid ester
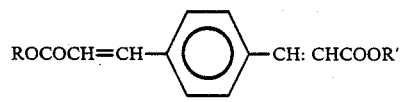

(ii.) methacrylic acid esters represented by $H_3CCH$: CHCOOR selected from epoxy-, urethane-, acryl- and amine-type esters; For example:
methyl methacrylate
$H_3CCH$: $CHCOOCH_3$
(iii.) others (2) Isomerization Materials (i) cyclization materials Stilbene
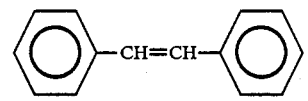

(ii) others (3) Other materials which are based on the above materials (1) and/or (2) and, further:
(i) which contain one or more photofunctional groups,
(ii) which contain two or more of the same or different functional groups,
(iii) which are monomers, oligomers including copolymers, or blends thereof,
(iv) which are blends of different molecules, and
(v) which are reacted upon irradiation of ultraviolet rays, visible rays, heat rays, and other radiation.

These photoreactive compounds may be used alone or in combination, depending upon the desired results and other factors, and may be also used in combination with other materials such as binding polymers as a binding agent and solvent.

Typical examples of useful binding polymers are:
(1) polyacrylic acid esters
(i) polymethylacrylate
(ii) polymethyl-α-bromoacrylate
(2) polymethacrylic acid esters
(i) polymethylmethacrylate
(ii) polyphenylmethacrylate (iii) polypentabromophenylmethacrylate
(iv) polypentachlorophenylmethacrylate
(v) polyisobutylmethacrylate
(vi) polytrifluoroethylmethacrylate
(3) styrene polymers
(i) polystyrene
(ii) poly o-chlorostyrene
(4) carbonate polymers
(i) polycarbonate
(ii) diethylene glycol allylcarbonate polymer (trade name: CR-39)
(5) vinyl polymers
(i) polyvinyl benzoate
(ii) polyvinyl acetate
(iii) polyvinyl carbazole
(iv) polyvinyl naphthalene
(v) polyvinyl butyral
(6) others
(i) polyacrylonitrile
(ii) polychlorotrifluoroethylene
(iii) polytetrafluoroethylene
(iv) talloleic acid diallyl polymer If desired, these polymers may be used in the form of blends or copolymers.

Further, if desired, any type of solvent may be used in combination with the photoreactive compounds or a mixture of the photoreactive compounds and the binding polymers. Solvents are particularly useful, if the photoreactive compounds used do not diffuse in the light-sensitive film, and other similar cases. As an example of the solvents, there are mentioned 1,4-dioxane, acetone, and the like. As described above, the photoreactive compounds can be used alone in the formation of the light-sensitive film of the present invention. More preferably, these compounds can be used together with other film-providing components. Useful combinations of the photoreactive compounds and other components are, for example:

(1) photoreactive compounds, particularly photopolymerizable materials (oligomer-providing materials), binding polymers and solvents,
(2) photoreactive compounds, particularly photopolymerizable materials and solvents, and
(3) photoreactive fluid compounds and binding polymers, and the like. In these combinations, the photoreactive compounds are preferably used in an amount of about 40 to 100% based on the total amount of the photoreactive compounds and the binding polymers. The amount of the solvents used is suitably determined after taking into consideration factors such as the viscosity of the resulting coating solution for the formation of the light-sensitive film.

The film-providing solution can be conventionally coated on a substrate, for example, a glass substrate, to form a light-sensitive film. Spin coating, brush coating, and other conventional coating techniques can be used in this step.

After the formation of the light-sensitive film, the film is subjected to selective exposure to obtain a lens or other optical elements. The selective exposure may be carried out by using a photomask having windows in positions corresponding to the positions of the lenses to be formed, and an exposure source. Any exposure sources can be used depending upon such factors as the composition of the light-sensitive film. Generally, ultraviolet rays having a wave length of about 280 to 450 nm are preferably used as the exposure source. If desired, visible rays or infra red radiation (heat rays) also may be used. The exposure intensity is about 10 to 400 mW/cm$^2$. The temperature during exposure depends on the photoreactive compounds used and their mixing ratio. When cinnamyl cinnamate is used as the photoreactive compound together with polymethylmethacrylate (polymerization degree of 2,000) as the binding polymer, a temperature of about 30° to 50° C. is preferable. During the selective exposure, an extremely low temperature should be avoided, since swelling of the film in the exposed area will not occur at such a temperature. Similarly, an extremely high exposure temperature should be avoided, since although swelling of the exposed film will occur, thereby providing a lens, the lens will have a large diameter and a flat configuration. In all cases, if the exposure temperature is not satisfactory, either a lens can not be obtained or only defective lenses can be obtained.

As a result of the selective exposure, the photoreactive compounds contained in the exposed region of the light-sensitive film are subjected to specific photoreactions such as dimerization, isomerization, polymerization, copolymerization, cross-linking reaction and similar reactions. These reactions cause variations in the evaporation pressure, melting point and diffusion rate of the photoreactive compounds, because the compounds are wholly or partially converted to the reaction products.

For example, when cinnamyl chloride or cinnamic acid capable of showing a dimerization reaction is used as the photoreactive compounds, the monomers and the reaction products thereof (dimers) can flow easily in a solvent such as 1,4-dioxane. In addition, if these photoreactive compounds are used together with the binding polymers such as polymethylmethacrylate, the monomers are easily diffused and flow in the light-sensitive film, unlike the dimers. Accordingly, only the monomers can flow from the unexposed region to the exposed region, and thus the dimers having no or less fluidity are increased in the exposed region, since the monomers from the unexposed region are newly converted to dimers. In comparison with the unexposed region, the top surface of the exposed region in which the dimers are being formed is raised. Since a surface tension also acts on the exposed region, the top surface of the region tends to be formed as a round and convex portion, i.e., a convex lens. In the above process, if it is necessary to increase the diffusion rate of the monomers and reduce that of the dimers, in addition to the incorporation of the binding polymers discussed above, solvents such as 1,4-dioxane can be added to the light-sensitive film and the amount of the solvents added can be controlled, to regulate the molecular weight of the polymers constituting the light-sensitive film, or a mixture of two or more photoreactive compounds can be used in a controlled ratio.

If desired, the exposed light-sensitive film, namely, lens- or other optical element-retaining film may be subjected to a stabilization process. The stabilization process is particularly useful, for example, when the photoreaction is a photopolymerization reaction in which the molecular size and the evaporation pressure both increase. As the stabilization process, there can be mentioned treatment of the film with heat. This treatment is intended to remove the unreacted photoreactive compounds from the film by evaporation, to stabilize the lens-retaining film. For example, when the lens-retaining film consists of monomers and dimers thereof, because the monomers and the dimers have different evaporation pressures and molecular sizes, only the monomers will be evaporated from the film upon heating. In another stabilization process, the lens-retaining film is subjected to an overall exposure of light. This stabilization process is intended to react all of the unreacted compounds in the film to form a stable reaction product, thereby stabilizing the film. For example, when this process is applied to the lens retaining film consisting of monomers and dimers, all of the monomers are converted to stable dimers. Further, alternatively, as the binding polymer it is also possible to use a polymer capable of cross-linking upon heating or a polymer capable of reacting with the dimers upon heating, for example, polymers containing epoxy-having glycidyl methacrylate. Upon heating, a cross-linking reaction caused between the binding polymers confines the dimers in the resulting cross-linked structure of the polymers or the dimers are bonded with the polymers, and thus stabilized lens-retaining coatings can be obtained.

Figure 3A:
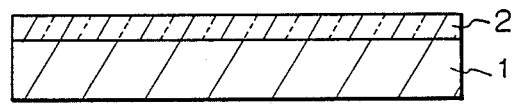
FIGS. 3A, 3B, and 3C are cross-sectional views illustrating, in sequence, the production of convex microlens arrays according to the present invention.
Figure 3B:
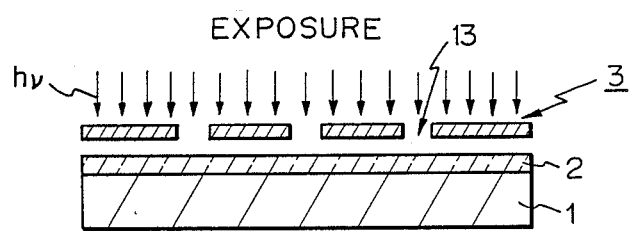
Figure 3C:
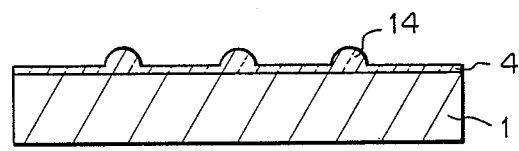

The present invention will be now described with respect to the production of convex microlens arrays, and with reference to FIGS. 3A, 3B, and 3C.

First, as shown in FIG. 3A, a film-providing solution containing a photoreactive compound is coated by spin coating on, for example, a glass substrate 1 to form a light-sensitive film 2. Thereafter, the light-sensitive film 2 is exposed through a photomask 3 (FIG. 3B) to radiation capable of causing a reaction of the photoreactive compound in the exposed area. The direction of the radiation is shown by arrows. Preferably, ultraviolet rays are used as the exposure source. The photomask 3 has windows 13, the position and configuration of which correspond to those of the lenses to be formed in the light-sensitive film 2. After selective exposure, lenses 14 (FIG. 3C) are formed in the exposed area of the film 2. The thickness of the unexposed area 4 of the film 2 is reduced compared with the original thickness thereof, because, as previously explained in detail, the unreacted photoreactive compounds migrated from the unexposed area to the exposed area upon selective exposure. Although not illustrated herein, if desired, the lens-retaining film may be stabilized by thermal treatment, overall exposure or other processes.

Figure 4A:
FIGS. 4A and 4B are photographs showing plane and cross-sectional views of the convex microlens according to the present invention.
Figure 4B:

FIG. 4A is a photograph showing a plane view of a convex microlens having a diameter of 100 μm (F=2.2) produced according to the present invention, and FIG. 4B is a photograph showing a cross-sectional view of the microlens of FIG. 4A. In these photographs, the maximum thickness of the lens is 10 μm, and the thickness of the unexposed area of the coating is 1.5 μm.

Figure 5A:
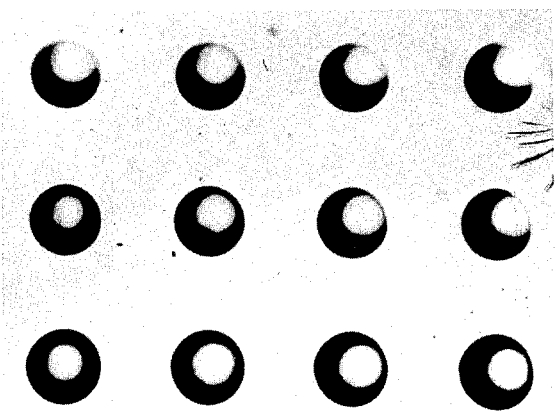
FIGS. 5A and 5B are photographs showing the convex microlens arrays according to the present invention and the use thereof.
Figure 5B:
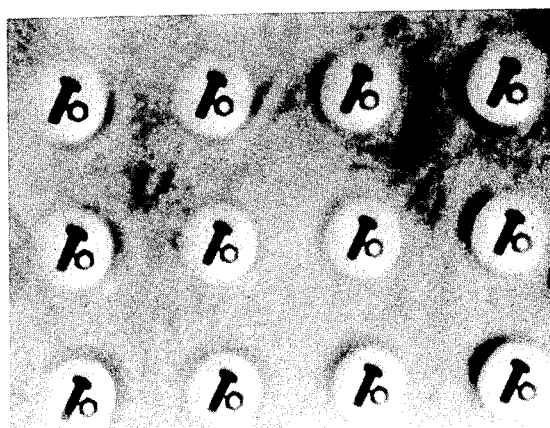

FIG. 5A is a photograph showing a plane view of convex microlens arrays (D=200 μm, f=400 μm) also produced according to the present invention. Using these microlens arrays, sets of bolts and nuts can be formed in the images shown in the photograph of FIG. 5B.

The process of the formation of the lens at the stage of selective exposure is further clarified by FIGS. 6A to 6E showing, in sequence, the variations in the configuration of the light-sensitive film 2. It should be noted that the photomask 3 is omitted from FIGS. 6B to 6E. This absence of the mask 3 is intended to indicate that exposure is not essential in the steps of FIGS. 6B to 6E, since even if the exposure is stopped, the variation of the configuration of the film does not stop, but on the contrary, progresses due to the actions of the reaction product in the exposed area. To stop the variation of the film configuration preferably the stabilization process is carried out as the final step.

Figure 6A:
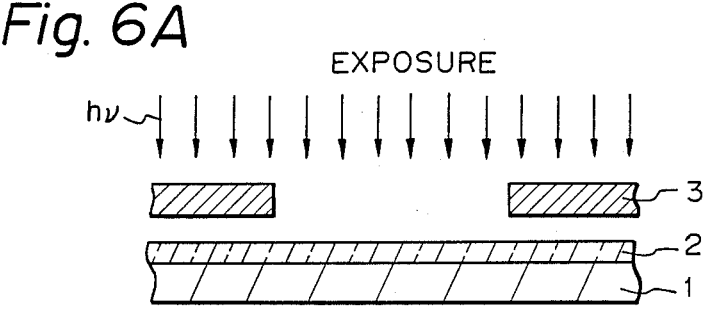
FIGS. 6A to 6E are cross-sectional views illustrating, in sequence, the process of the formation of the lens upon exposure.
Figure 6B:
Figure 6C:
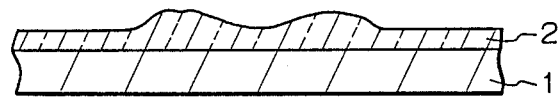
Figure 6D:
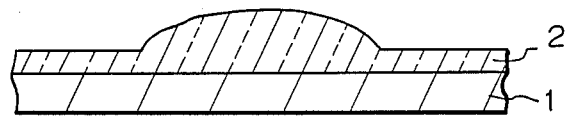
Figure 6E:
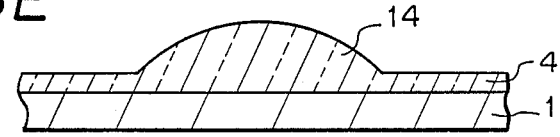

FIG. 6A shows the light-sensitive film 2 immediately after the start of a selective exposure using a circular mask 3. At the initial stage of exposure, as illustrated in FIG. 6B, the light-sensitive film 2 exhibits a small variation of the surface configuration. Namely, in the exposed area of the film 2, only limited portions adjacent to the unexposed area are raised. This is because differences in characteristics occur between two adjacent areas, and thus the unreacted compounds in the unexposed area start to permeate into the exposed area. The results of a further permeation of the unreacted compounds can be seen in FIG. 6C which shows a ring-like projection of the film. Therefore, if a ring-shaped lens is desired, the permeation of the unreacted compounds may be terminated at this stage or the step of FIG. 6B. Continuing the permeation of the unreacted compounds causes an additional surface tension and the like to occur, and thus the projection of the film increases in roundness (see FIG. 6D). At the final stage, a lens 14 having desired characteristics is obtained.

Figure 7:
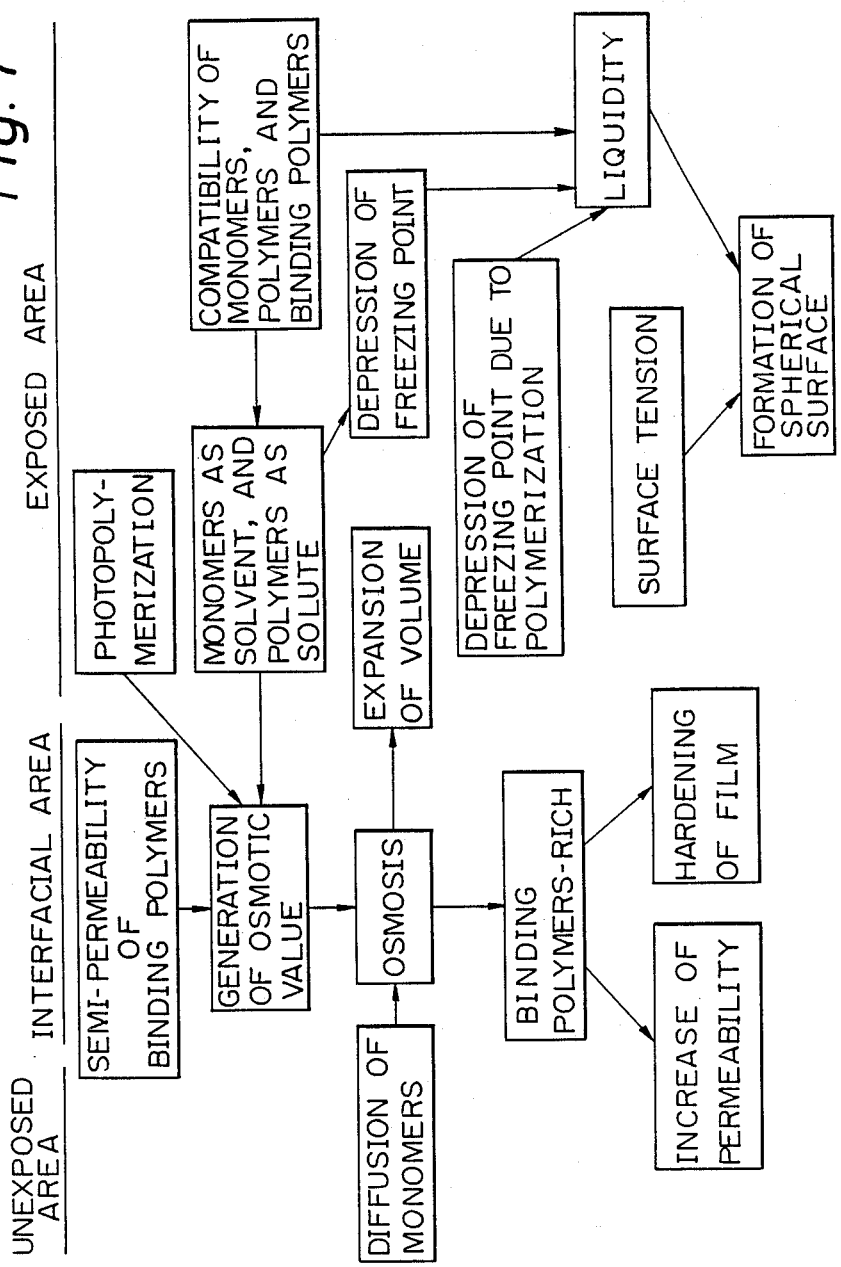
FIG. 7 is a diagram showing a mechanism of the formation of the lens according to the present invention.
Figure 8:
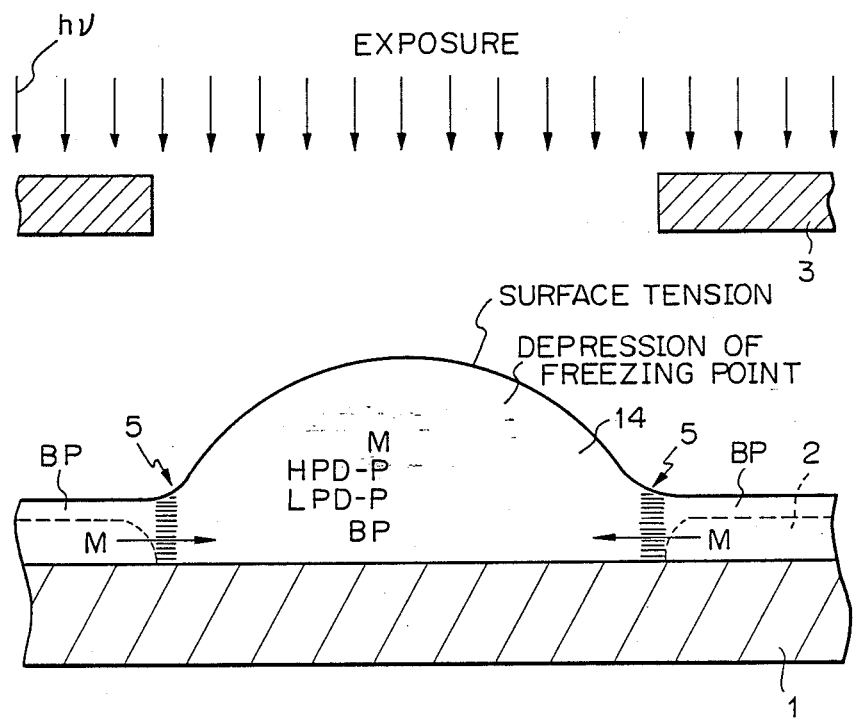
FIG. 8 is a cross-sectional view showing a mechanism of the formation of the lens according to the present invention.

FIGS. 7 and 8 are diagrams showing a mechanism of the formation of the lens according to the present invention, by which the lens forming mechanism of the present invention will be further clarified. In the following description, if there is a mixture of two or more substances, a substance having a relatively higher evaporation pressure and smaller molecular size is defined as a "solvent", and another substance having a relatively lower evaporation pressure and larger molecular size is defined as a "solute". Thus, in this instance in which photopolymerizable substances are used as the photoreactive compound, monomers act as a solvent, and polymers, reacted products, act as a solute.

A comparison of the composition of the light-sensitive film in the exposed area and the unexposed area, as well as before, during, and after exposure, is summarized in the following Table 1.

TABLE 1

|  | Unexposed area |  | Exposed area |
|---|---|---|---|
| Before exposure | M |  | M |
|  | BP |  | BP |
|  | (S) |  | (S) |
| During exposure | M | —osmosis→ | M |
|  | BP |  | HPD—P |
|  | (S) |  | LPD—P |
|  |  |  | BP |
|  |  |  | (S) |
| After exposure | M |  | M |
|  |  |  | HPD—P |
|  | BP |  | BP |

Before selective exposure, the light-sensitive film contains photopolymerizable substances, monomers M, binding polymers BP, and a solvent S (if necessary).

During exposure, the monomers M in the unexposed area permeate or migrate into the exposed area, and in the exposed area, as a result of photopolymerization caused by the exposure, polymers with a low polymerization degree (LPD-P) and polymers with a high polymerization degree (HPD-P) are concurrently produced. This stage will be further described with reference to FIG. 8, showing an interfacial area 5 between the exposed and unexposed areas of the light-sensitive film 2.

In the interfacial area 5, the binding polymers BP are rich and the monomers M are poor. Accordingly, and since the area 5 is harder than other portions of the film 2, the area 5 acts as a "semipermeable membrane". The monomers M diffuse in each of the exposed and unexposed areas, and, as shown by the arrows M, permeate from the unexposed area through the interfacial area or semipermeable membrane to the exposed area due to an osmotic pressure created between the two areas. The dotted line in the unexposed area indicates that the concentration of the monomers M is reduced by the amount plotted. In the exposed area, polymerization of the monomers M occurs, and thus the amount of the polymers HPD-P, LPD-P, and B is gradually increased. However, in spite of the increase of the polymers in the exposed area, a liquidity or property as a liquid of the film in this area is constantly maintained because of the depression of the freezing point also created in this area. In FIG. 7, while it is shown that the depression of the freezing point is due to polymerization, the freezing speed is also reduced due to polymerization in some cases. Further, since a surface tension acts on a surface of the liquid or liquid-like film, the roundness which is essential to the formation of a lens is conferred on the film surface.

After exposure, the binding polymers BP and a small amount of the monomers M remain in the unexposed area. On the other hand, polymers HPD-P, the monomers M, and the binding polymers BP remain in the exposed area. The monomers M, i.e., unreacted compounds, in this area can be removed from the film by heat treatment or converted to HPD-P polymers by an overall exposure.

During the photopolymerization, the monomers M and the polymers LPD-P and HPD-P in the light-sensitive film each act as follows:
  Monomers M diffusion in the exposed and unexposed areas
  Polymers LPD-P diffusion in a mixture of the monomers M and the solvent S (if any)

The expansion of the volume in the exposed area of the film is caused by osmosis and swelling, explained as follows:
  Osmosis  The monomers M and the polymers LPD-P each act as a solvent and as a solute. Upon exposure, a concentration of the solute is increased, and thus an osmotic value is generated in the interfacial area between the exposed and unexposed areas, and accordingly, the monomers M in the unexposed area migrate into the exposed area.
  Swelling  The monomers M act as a solvent, and the polymers HPD-P and the binding polymers BP act as a solute. Before exposure, the film is considered to in a swelling condition in thermal equilibrium. With the progress of the exposure, the polymers HPD-P are produced in the exposed area, and therefore, thermal equilibrium in this area is broken. To maintain thermal equilibrium, the exposed area absorbs the solvent, i.e. monomers M, from the areas adjacent thereto, and as a result, the exposed area is expanded.

The formation of a spherical surface of the film in the exposed area is caused in particular by the lowering of the freezing point and freezing speed and by the surface tension. First, the following reaction is induced when the light energy acts on the monomers M:
  monomers

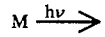

monomers M+ polymers LPD-P Namely, a mixture of M and LPD-P is produced. Since this reaction lowers the freezing point and freezing speed, a liquid state of the film is retained. Further, due to this liquid state of the film, and for other reasons, a surface tension is also induced in the film. This phenomena cause the formation of a spherical surface of the film.

The formation of the lens depends on various factors such as the film thickness, composition and concentration of the film, exposure conditions, and specific materials used. To ascertain this phenomenon, the lens was produced in accordance with the present process and by using cinnamyl chloride as the photoreactive compound and polymethylmethacrylate (polymerization degree of about 10,000) as the binding polymer. The following results were obtained.

Thickness of film

Figure 9:
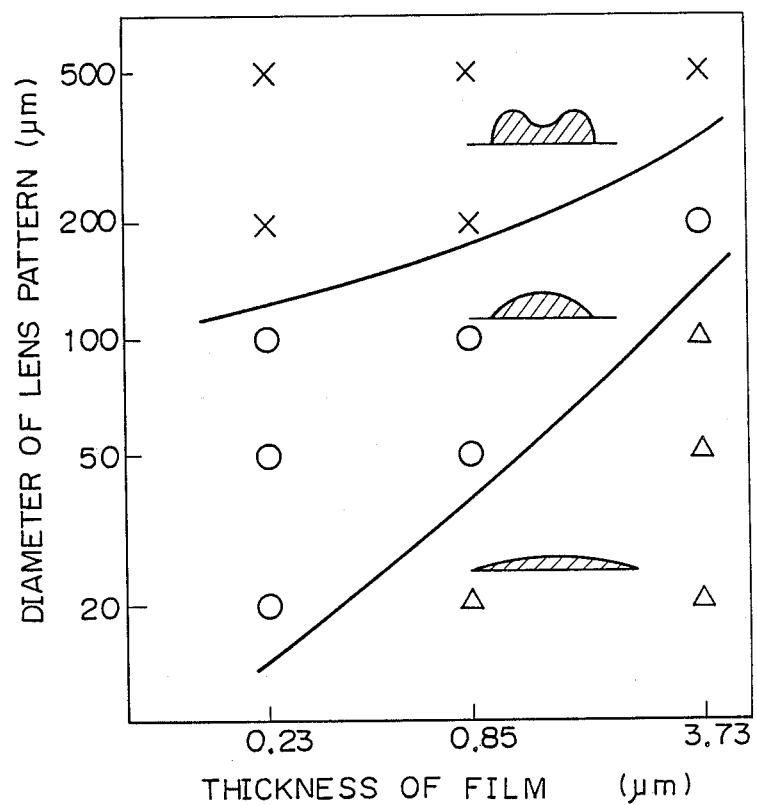
FIG. 9 is a graph showing a relationship between the thickness of the film and the diameter of the lens pattern.

The relationship between the thickness of the film and the diameter of the lens is plotted in FIG. 9. This data was obtained at an exposure time of 60 min. and a cinnamyl chloride concentration of 67% by weight. From this graph, it can be seen that the diameter of the lens is increased in accordance with the increase of the film thickness. This is because, if the film has a large thickness, a much larger amount of the monomers can migrate into the exposed area of the film.

Composition of film

Figure 10:
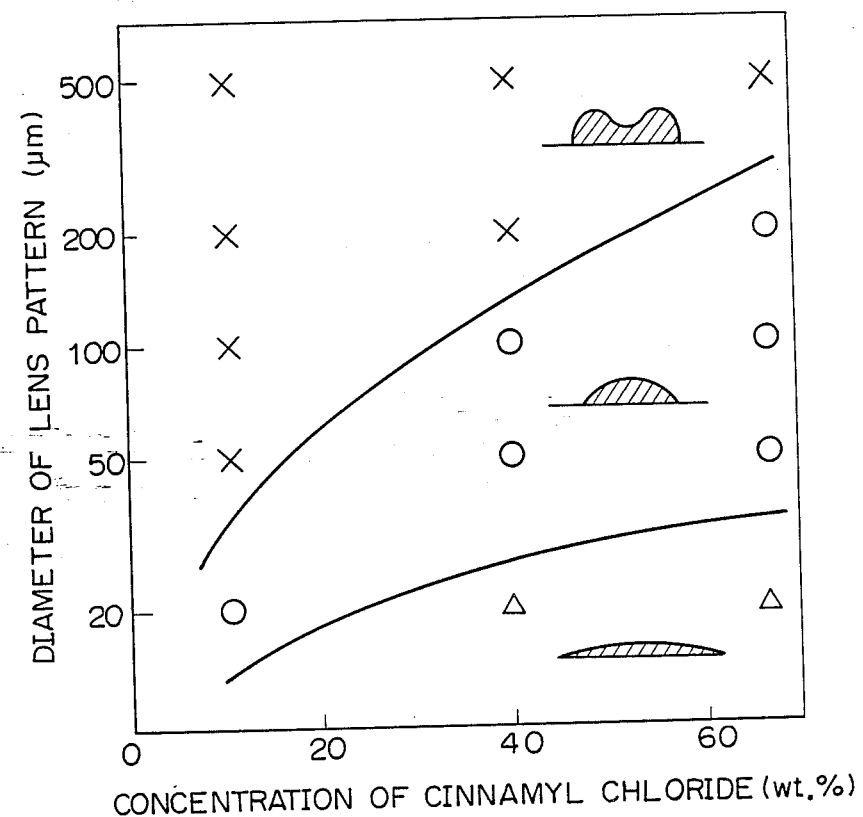
FIG. 10 is a graph showing the relationship between the concentration of cinnamyl chloride and the diameter of the lens pattern.

The relationship between the cinnamyl chloride concentration and the diameter of the lens pattern is plotted in FIG. 10. This graph indicates that, when the lens is produced, a larger diameter is obtained if there is a higher concentration of the monomers in the film. The reason for this relationship is the same as that for the relationship between the film thickness and the diameter of lens discussed above. In addition, if the concentration of the monomers in the film is increased, the polymers, which are also included, can move more easily in the film, and as a result, the diameter of the lens is increased.

Diameter of Exposed Area

The configuration of the lens depends on the diameter of the exposed area. FIGS. 9 and 10 indicate that, assuming that the thickness and composition of the film are constant, a ring-shaped lens can be obtained when the diameter of the exposed area is large, and a lens with an excessively large diameter and having no power to condense light can be obtained when the exposed area has a small diameter.

Exposure Conditions

Figure 11:
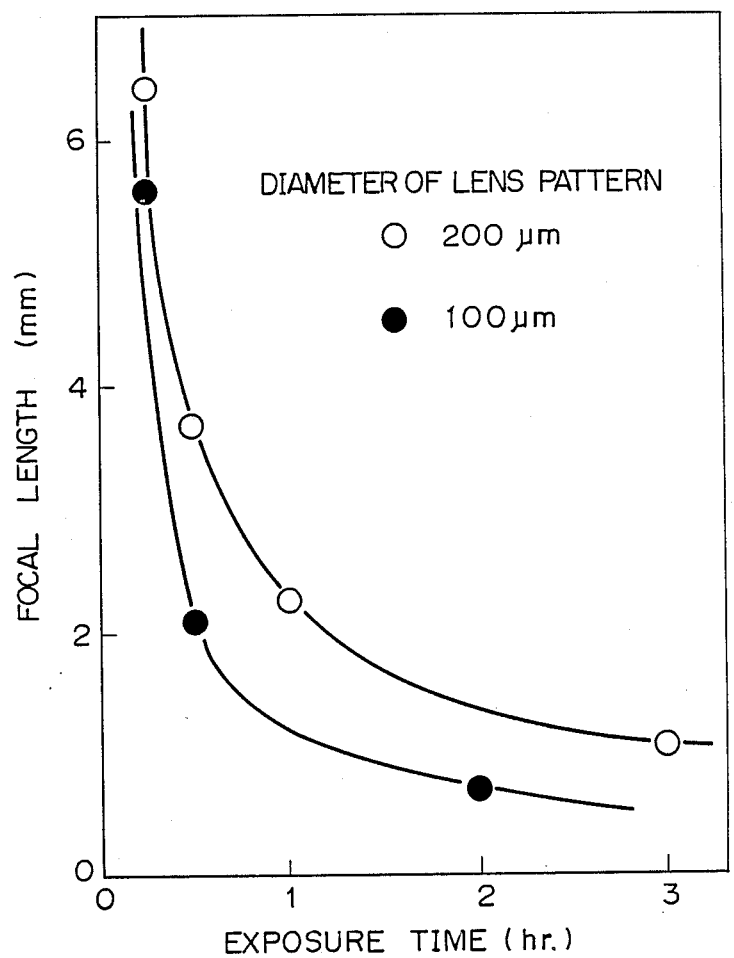
FIG. 11 is a graph showing the relationship between the exposure time and the focal length.

FIG. 11 is a graph showing the relationship between the exposure time and the focal length of the lens. This graph shows that a shorter focal length is obtained with a longer exposure time. In addition, a shorter focal length can be also obtained by a higher exposure intensity of the radiation. However, an excessively high exposure intensity must be avoided, since this will cause a hardening of the film in a central portion of the exposed area, and the hardening of the film in the exposed area will prevent the swelling of the film. The exposure temperature is preferably about 40° C. A lower temperature than the above will not allow a permeation of the monomers from the unexposed area to the exposed area, and at a temperature higher than the above lenses with an unacceptably large diameter will be formed.

As is apparent from the above descriptions, according to the present invention, it becomes possible to produce micronized optical elements such as microlenses and arrays thereof. The optical elements can be freely designed. Further, because the resulting optical elements are in the form of a film or coating, they can be easily integrated with other optical elements. Furthermore, because of the simple production process, the optical elements can be produced on a mass-production scale and with low production costs.

In the practice of the present invention, selective exposure of the light-sensitive film is generally carried out through a photomask disposed on the film. Alternatively, it is possible to carry out the selective exposure through a photomask disposed between the light-sensitive film and the underlying substrate. This method is referred to herein as a back-side exposure and will be explained hereinafter with reference to FIGS. 12A to 12C.

Figure 12A:
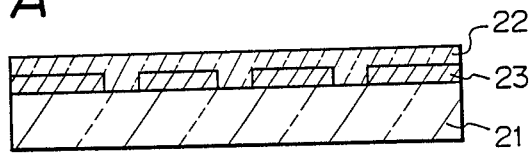
FIGS. 12A to 12C are cross-sectional views illustrating, in sequence, the lens formation process according to another embodiment of the present invention.

In FIG. 12A, a substrate 21 has a mask 23 of chromium and chromium oxide deposited thereon. The mask 23 acts a photomask and as a shadow mask, as described below. Since the selective exposure is carried out from the substrate side, the substrate 21 must allow the passage therethrough of the exposure radiation. Therefore, preferably a glass substrate is used as the substrate 21. A light-sensitive film 22 containing photoreactive compounds is coated over the substrate 21.

Figure 12B:
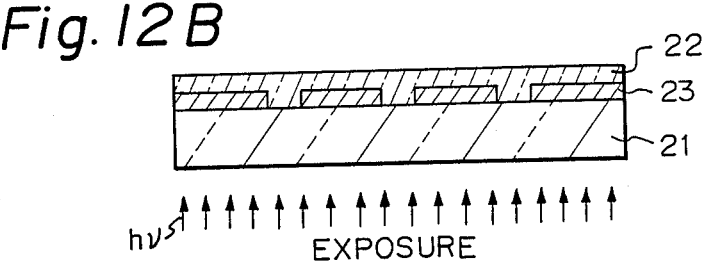
Figure 12C:
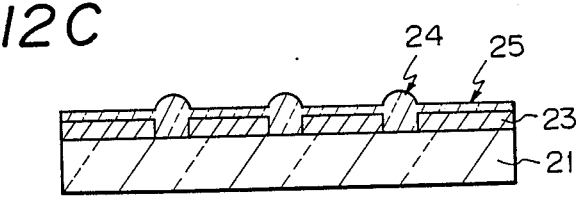

The back-side exposure is conducted as shown in FIG. 12B, to produce the lenses 24 of FIG. 12C. From FIG. 12C, it is clear that the exposed area 24 has a lens shape and the unexposed area 25 has a reduced film thickness. The shadow mask may be formed from a part or whole of the photomask. The resulting optical device having a shadow mask incorporated therein can be effectively used, for example, in the production of image sensors.

Since the mask used herein as the photomask also acts as a shadow mask and a back-side exposure is used, drawbacks due to use of the usual shadow mask can be prevented. For example, it is not necessary to align the lens with the shadow mask, and therefore lenses are not damaged during an alignment step, and a poor accuracy of the lens due to a reflection of the exposure light from the back surface of the substrate is avoided.

Figure 13:
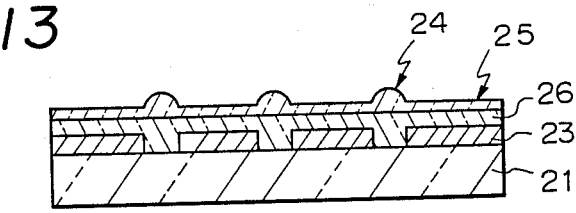
FIG. 13 is a cross-sectional view showing a modification of the optical device of FIG. 12C.

FIG. 13 is a modification of the optical device of FIG. 12C. The device illustrated in FIG. 13 has a spacer 26 provided between the lens-retaining film 26 and the shadow mask 23 The spacer 26 is used to obtain a planar surface to which the light-sensitive film is applied.

Figure 14A:
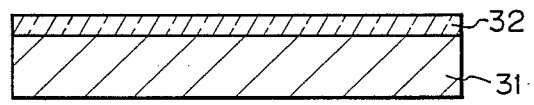
FIGS. 14A to 14C are cross-sectional views illustrating, in sequence, the lens formation process according to still another embodiment of the present invention.
Figure 14B:
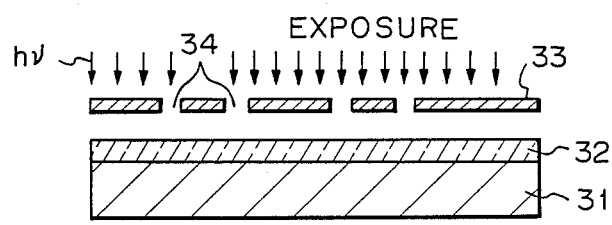
Figure 14C:
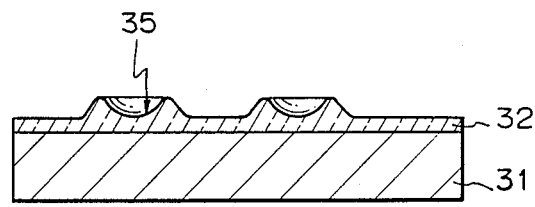

FIGS. 14A to 14C illustrate, in sequence, the production of concave microlenses according to another embodiment of the present invention. The lens production mechanism in the illustrated instances is substantially the same as that used in the production of the convex lenses described above.

First, as shown in FIG. 14A, a light-sensitive film 32 containing photoreactive compounds such as monomers is coated on a substrate 31. Then, as shown in FIG. 14B, the light-sensitive film 32 is exposed to radiation passed through windows 34 of the photomask 33, to cause a variation in the configuration of the film 32. After exposure, concave lenses 35 are formed in the film 32 (see FIG. 14C), and finally, the unreacted photoreactive compound in the film 32 is stabilized as previously described.

The formation of the concave microlenses and arrays thereof will be further described with respect to the preferred embodiments shown in FIGS. 15A and 15B and FIGS. 16A and 16B.

Figure 15A:
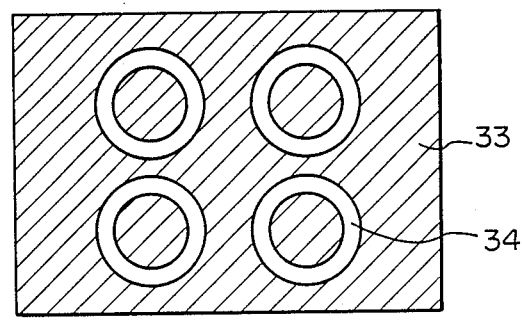
FIGS. 15A and 15B illustrate the production of the concave lens arrays according to an embodiment of the present invention.
Figure 15B:
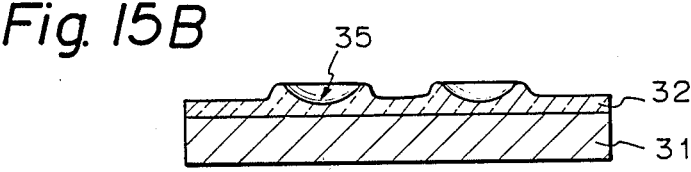
Figure 16A:
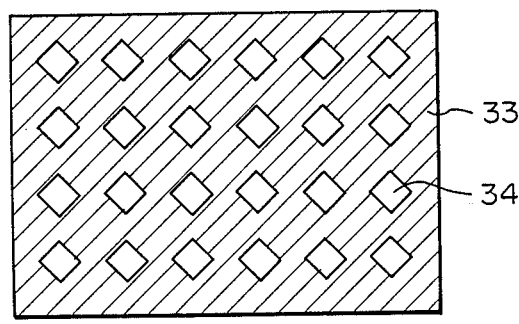
FIGS. 16A and 16B illustrate the production of the concave lens arrays according to another embodiment of the present invention.
Figure 16B:
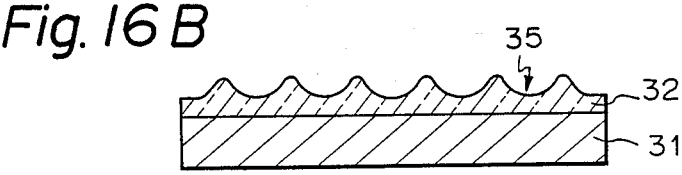

FIG. 15A illustrates a photomask 33 with ring-shaped windows 34. The position of the windows 34 in the mask 33 corresponds to that of the lenses 35 to be formed on the light-sensitive film 32 (see FIG. 15B). During the exposure step, the exposure radiation passed through the windows 34 of the mask 33 will irradiate only limited areas, namely, peripheral portions of the lens-providing area of the film 32. As a result, in the film 32, the monomers in the light-irradiated areas are polymerized to dimers or other polymers, thereby obtaining a mixed composition of the monomers and dimers or polymers. Since the mixture in the exposed areas has a lower evaporation pressure than that of the monomers in the unexposed areas, the monomers in the unexposed areas are absorbed by and migrated into the exposed areas, and the exposed areas thus expanded In this instance, since the exposed areas are in the form of a ring, the monomers are absorbed from the inner and outer unexposed areas adjacent to the ring-shaped exposed area. With the expansion or raising of the ring-shaped exposed area, a central portion of the exposed area relatively subsides, and finally, as shown in FIG. 15B, concave lenses 35 with a small curvature are obtained FIGS. 16A and 16B illustrate another example of the production of the concave microlenses and arrays thereof according to the present invention As shown in FIG. 16A, a photomask 33 has a plurality of square windows 34 which are disposed in a grid pattern After a selective exposure using the photomask 33, a plurality of concave microlenses 35 are formed in the unexposed area of the light-sensitive film 32. The resulting microlens arrays can be used, for example, in fiber optic communications.

Figure 21:
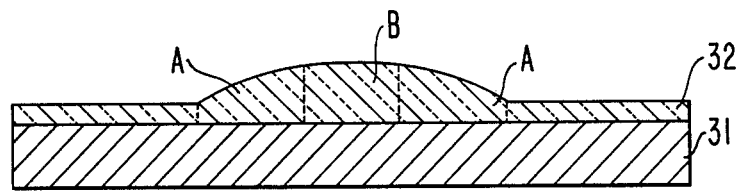
FIGS. 21 and 22 illustrate a distributed index lens and a Fresnel lens, respectively, according to embodiments of the present invention.
Figure 22:
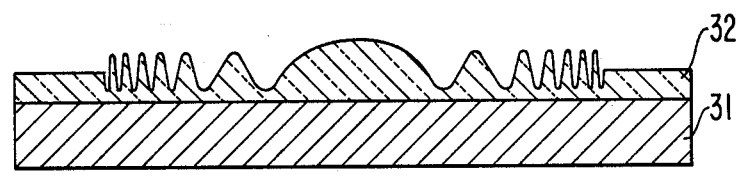

FIGS. 21 and 22 illustrate more examples of microlenses according to the present invention, FIG. 21 illustrates a distributed index lens, in which, by definition, a fringe area A has a lower refractive index than a central area B. FIG. 22 illustrates a Fresnel lens.

According to another embodiment of the present invention, a solvent is added to a film-providing composition for use in the formation of the light-sensitive film. The added solvent is then removed from the film at the same time as or after the selective exposure. This is particularly effective when satisfying the following requirements:

(1) The photoreactive compounds must diffuse within the light-sensitive film, and
(2) At least a mixture of the photoreactive compounds and the reaction products thereof must be in a liquid state, which conditions, as discussed above, are essential in the mechanism of the formation of the optical elements according to the present invention.

For example, photoreactive compounds or monomers such as cinnamic acid or cinnamic acid cholesterol, if used alone, can not diffuse within the light-sensitive film. Also, a mixture of these monomers and the dimers thereof is not usable, since such a mixture is solid at a temperature at which the exposure radiations are irradiated onto the film Further, polymeric materials with a high polymerization degree are not usable as the binding polymers, since if the film contains such high polymeric materials, the photoreactive compounds can not diffuse in the film.

The above drawbacks are avoided by adding specific solvents to the light-sensitive film, and as a result, it can be ensured that the photoreactive compounds diffuse in the film and the mixture of these compounds and reaction products thereof has liquid properties The present inventors found that the combinations of the photoreactive compounds, binding polymers and solvents summarized in the following Table 2 are preferable in the practice of the present invention, for example:

TABLE 2

| film-providing composition | photoreactive compound | binding polymer | solvent |
| --- | --- | --- | --- |
| A | cinnamic acid | PMMA* | 1,4-dioxane |
| B | cinnamic acid cholesterol | PMMA* | 1,4-dioxane, propylene carbonate |
| C | cinnamic acid, vinyl cinnamate | PMMA* | vinyl cinnamate |

PMMA* polymethyl methacrylate

In the film-providing compositions A and B, 1,4-dioxane and/or propylene carbonate is used as the solvent. After selective exposure, the solvent can be removed from the film by annealing. In the film-providing composition C, vinyl cinnamate is used as the solvent and as the photoreactive compound in combination with cinnamic acid. Since vinyl cinnamate is a dimerizable compound, after selective exposure of the film, it can be stabilized by annealing to cause a thermal polymerization.

According to the present invention, it becomes possible to use photoreactive compounds and binding polymers, which can not used alone, as the light-sensitive film-providing compounds in the production of optical elements such as lenses and gradient thickness films according to the present invention. Preferable solvents include 1,4-dioxane and other solvents having an evaporation pressure lower than that of 1,4-dioxane at an exposure temperature According to another embodiment of the present invention, after selective exposure of the light-sensitive film, the exposed film is left to stand without further irradiation of light to further vary a configuration of the film. After this variation-increasing step, the film is preferably subjected to overall exposure to stop any further variation of the film configuration. Penetration of the monomers as the photoreactive compounds from the unexposed area to the exposed area, and a corresponding increase of the film thickness of the exposed area during this step, will be stopped, since the remaining monomers are photopolymerized to become dimers and other polymers upon overall exposure. A greatly increased thickness of the exposed film will produce various optical devices having excellent characteristics.

The above embodiment of the present invention can be performed as follows. A light-sensitive film containing at least photoreactive compounds is coated on a substrate. The light-sensitive film used herein has different compositions. For example, (1) it consists of photoreactive compounds only, (2) it consists of the photoreactive compounds and the binding polymers, (3) it consists of the photoreactive compounds and the solvents, or (4) it consists of the photoreactive compounds, the binding polymers and the solvents These photoreactive compounds, binding polymers, and solvents have been previously exemplified.

After formation of the light-sensitive film, the film is subjected to selective exposure using a photomask with windows. The pattern of the windows depends on particular optical elements Upon exposure, the evaporation pressure of the photoreactive compounds in the exposed area of the film is varied as a result of dimerization, isomerization, polymerization, and other photoreactions. For example, when cinnamyl chloride is used as the photoreactive compound and PMMA as the binding polymer, cinnamyl chloride in the exposed area of the film is dimerized by the irradiation of light, and thus a remarkable reduction of the evaporation pressure in the exposed area is obtained Accordingly, there is a coexistence of cinnamyl chloride monomers and the dimers thereof in the exposed area Under this condition, unreacted cinnamyl chloride in the unexposed area is continually absorbed by and moved to the exposed area. On the other hand, cinnamyl chloride existing in the exposed area remains there. Therefore, when the exposed film is left to stand without a further irradiation of radiation, a continuous supply of the unreacted cinnamyl chloride in the unexposed area to the exposed area occurs, and during that stage, the expansion of the exposed area continues. A remarkably large variation in the film thickness in the exposed and unexposed areas is thus obtained.

Figure 17:
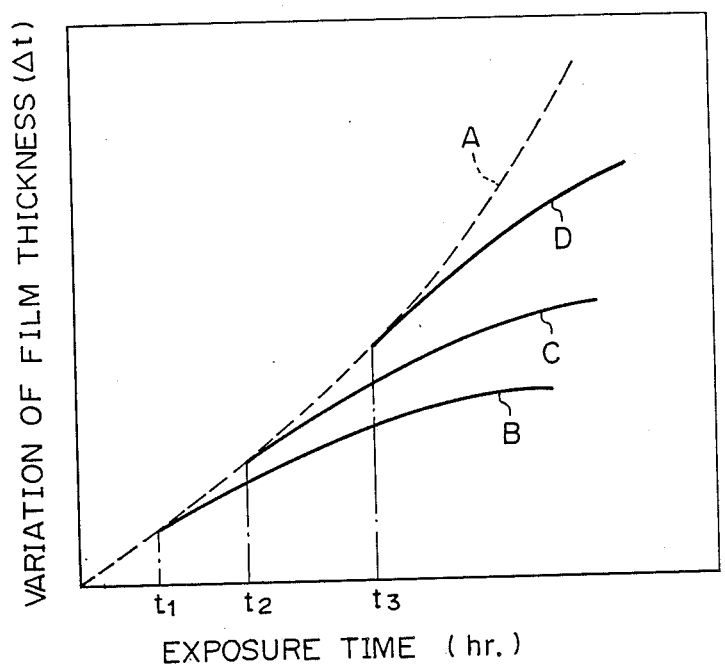
FIG. 17 is a graph showing the relationship between the exposure time and the variation of the film thickness.

FIG. 17 is a graph showing the relationship between the exposure time and the variation of the thickness of the light-sensitive film during the selective exposure step of the film. When the exposure is continued as shown by the dotted line A, the thickness of the exposed film is gradually increased in accordance with the exposure time. Further, although the rate of increase of the film thickness is not higher than that shown by line A, similar tendencies can be seen in the solid lines B, C, and D. In the case of line B, the exposure was interrupted at $t_1$, line C at $t_2$, and line D at $t_3$, respectively After interruption of the exposure, the exposed films were left to stand. The graph of FIG. 17 indicates that, after completion of the exposure, the increase of the thickness of the film in the exposed area is not stopped, but is continued, even if the film is not subjected to additional exposure When a desired distribution of the thickness of the film is attained, the increase of the film thickness can be stopped by overall exposure or annealing of the film. All of the unreacted compounds are therefore optically or thermally reacted to form the corresponding stable reaction products, or are removed.

In accordance with still another embodiment of the present invention, optical elements such as lenses and gradient thickness films can be produced by selectively exposing a light-sensitive film containing at least photoreactive compounds to exposure radiation, generating differences in the concentration of the reaction products in the photoreactive compounds between the exposed and unexposed areas of the film, and then causing, in an interface between the exposed and unexposed areas, an osmosis phenomenon causes a reduction in the differences in the concentration, thereby varying the configuration of the film.

Figure 18A:
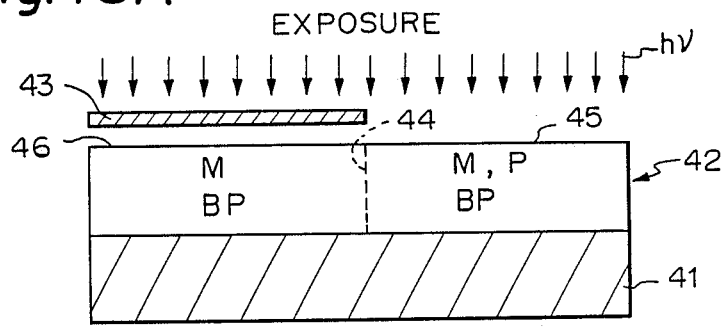
FIGS. 18A and 18B illustrate the production of the gradient thickness films according to still another embodiment of the present invention.
Figure 18B:
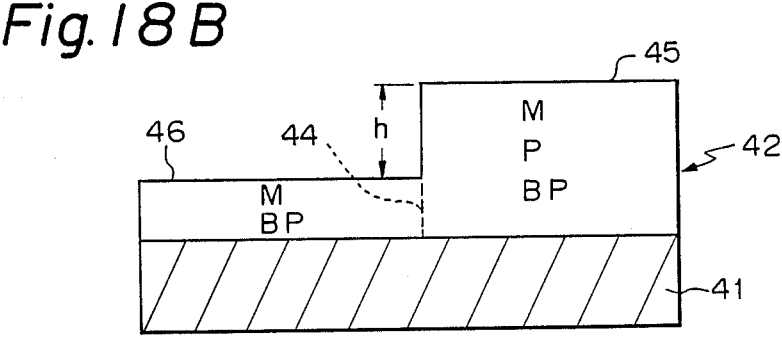

The mechanism of this production process is illustrated in FIG. 18A (during exposure) and FIG. 18B (after exposure). In FIG. 18A, a substrate 41 is coated with a light-sensitive film 42. The film 42 consists of photoreactive compounds, particularly photopolymerizable materials M and binding polymers BP. The photoreactive compounds M are selected from those which can diffuse in the film 42 and which when mixed with the reaction products thereof formed upon irradiation of radiation is a liquid during exposure. The binding polymers BP are selected from among those which can effectively generate an osmosis or similar phenomenon in an interface 44 of the exposed area 45 and the unexposed area 46.

Selective exposure of the light-sensitive film 42 is conducted with radiation passed through windows of a photomask 43. As a result, in the exposed area 45 of the film 42, the reaction products P are produced from the photoreactive compounds M. The formation of the reaction products P is continued until the photoreactive compounds M and completely consumed in the exposed area 45, and therefore, the volume of the area 45 is gradually increased. The smaller the ratio of the exposed area 45 to the unexposed area 46, the larger the volume of the area 45, and thus a difference in the film thickness between the exposed and unexposed areas is obtained.

Figure 19:
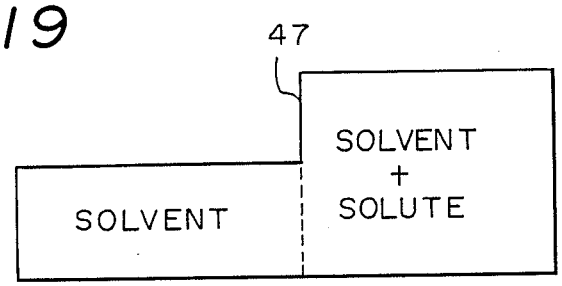
FIG. 19 is a schematic view showing a principle of the production process of FIGS. 18A and 18B.

The above action and mechanism will be further described with reference to FIGS. 18B and 19. The action of the present process is substantially the same as the osmosis phenomenon which, as shown in FIG. 19, is generated when a solvent and a solute is separated with a semi-permeable membrane 47. Namely, in the present process, the photoreactive compounds M act as a solvent and the reaction products P of the compounds M act as a solute. The reaction products P are produced based on a chemical reaction induced by an irradiation of radiation. The interface 44 between the exposed and unexposed areas acts as a semi-permeable membrane In FIG. 18B, the exposed area 45 of the film 42 contains the reaction products P in addition to the reactive compounds M When the reactive compounds M have a solvent-like property with regard to the reaction products P, a concentration of the reaction products P in the exposed area 45 is increased upon the irradiation of radiation, and with increase of the concentration, an osmosis phenomenon is generated which reduces the concentration of the products P in the interface 44 between the exposed area 45 and the unexposed area 46. The osmosis phenomenon then induces a migration of the reactive compounds M in the unexposed area 46 into the exposed area 4. As a result of the migration of the compounds M, as indicated by "h", a large difference in the film thickness is produced between the exposed area 45 and the unexposed area 46.

According to this embodiment of the present invention, due to the osmosis phenomenon caused by the irradiation of radiation, a notably large variation in the thickness of the light-sensitive film can be attained. Further, assuming that an outer force such as gravity does not act upon the system, an expansion of the volume of the film will be continued until the photoreactive compounds in the film are exhausted. Such a large variation in the configuration of the film is practically very useful in the production of the optical elements.

In accordance with still another embodiment of the present invention, optical elements such as lenses and gradient thickness films can be produced by selectively exposing a light-sensitive film containing at least photoreactive compounds to form reaction products of the photoreactive compounds, and swelling the reaction products by the absorption of certain compounds which are also contained in the film, thereby varying the configuration of the film.

The formation of the optical elements in this embodiment relies upon a swelling of the reaction products in the exposed area of the light-sensitive film. The reaction products are swollen, because they can absorb certain compounds which are also contained in the film. Although the compounds to be absorbed by the reaction products are not restricted, insofar as they are compatible with other compounds in the film and are absorbed by the reaction products, such compounds are preferably identical with the photoreactive compounds used. The present inventors found that a photopolymerizable compound such as cinnamyl chloride is effective for this purpose.

The above-described formation of the optical elements will be further described with reference to FIGS. 20A and 20B. A light-sensitive film 52 is positioned on the substrate 51 and consists of photo-reactive compounds M, compounds N capable of being absorbed by the reaction products P of the compounds M (compounds N may be the same or different from the compounds M), and binding polymers BP. As the photoreactive compounds M, any compounds which are diffusible in the film 52 and the reaction products P thereof produced by the irradiation of radiation can swell as a result of an absorption of the compounds M and/or N, can be used. For example, suitable photoreactive compounds M include cinnamyl chloride, and suitable compounds N include a mixture of cinnamyl chloride and 1,4-dioxane as a solvent or methylmethacrylate oligomers.

Figure 20A:
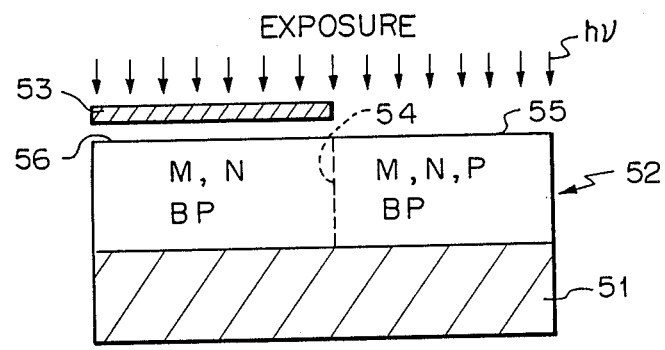
FIGS. 20A and 20B illustrate the production of the gradient thickness films according to still another embodiment of the present invention.
Figure 20B:
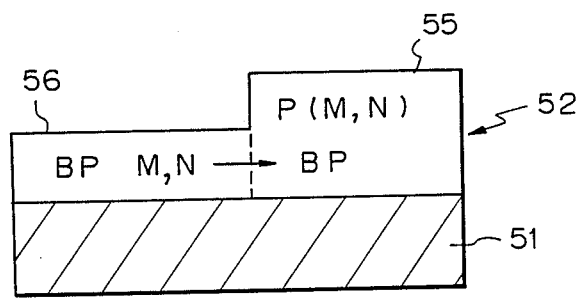
Figure 23:
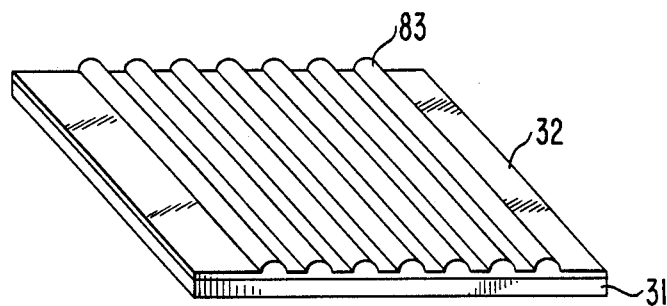
FIGS. 23 and 24 illustrate types of gradient thickness films which may be produced according to an embodiment of the present invention.
Figure 24:
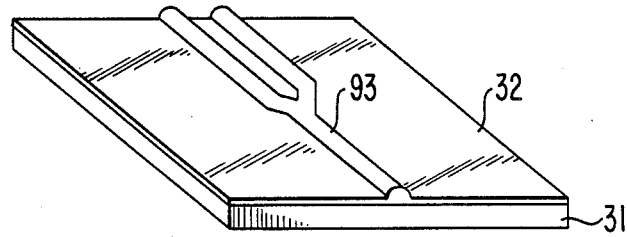

As illustrated in FIG. 20A selective exposure of the film 52 is carried out through a photomask 53. During this exposure, reaction products P of the compounds M are produced in the exposed area 55. These reaction products P absorb the compounds M and/or N contained in the exposed area and swell. Then, the absorbed compounds M further produce reaction products P. These new reaction products P absorb the compounds M and/or N diffused from the unexposed area 56 and swell. The exposed area 55 containing the reaction products P therefore continues to swell, so long as the compounds M and/or N are supplied to that area. FIG. 20B shows the results of the formation process according to the described embodiment. Type of gradient thickness films which are possible include a diffraction grating, as illustrated in FIG. 23, and an optical waveguide, as illustrated in FIG. 24.

According to the present invention, a large variation in the form of the light-sensitive film can be obtained because the expansion of the exposed area of the film is induced by the irradiation of radiation. Further, if an outer force such as gravity does not affect the system, the expansion of the exposed area will be continued until the photoreactive compounds in the film are exhausted. Accordingly, optical elements such as gradient thickness films having a remarkably varied film form can be obtained.

We claim:

1. A process for the production of an optical element, without a development step following an exposure step, which comprises the steps of;
    forming on a substrate a light-sensitive film containing at least a photoreactive compound which, when selectively exposed to radiation, can cause migration of unreacted photoreactive compound from unexposed areas to exposed areas adjacent to the unexposed areas in addition to the reaction of the photoreactive compound in the exposed areas; selectively exposing the light-sensitive film to radiation; and causing migration, as a result of the selectively exposing, of the unreacted compound in the unexposed areas into the exposed areas and reaction of the photoreactive compound in the exposed area to change a configuration of the exposed areas to conform with a desired configuration of the optical element.

2. A process according to claim 1 in which the photoreactive compound is a photopolymerizable substance.

3. A process according to claim 2 in which the photopolymerizable substance is an oligomer or oligomer providing substance.

4. A process according to claim 2 or 3 in which the photopolymerizable substance has a binding polymer associated therewith.

5. A process according to claim 1 in which selective exposure of the light-sensitive film is carried out through a photomask disposed over the light-sensitive film.

6. A process according to claim 1 in which selective exposure of the light-sensitive coating is carried out through a photomask disposed between the light-sensitive film and the underlying substrate.

7. A process according to claim 1 in which after formation of the optical element, the element-retaining film is stabilized.

8. A process according to claim 7 in which the optical element-retaining film is treated with heat to remove unreacted photoreactive compound.

9. A process according to claim 7 in which the optical element-retaining film is subjected to an overall exposure of light to complete a reaction of the unreacted photoreactive compound, thereby providing a stable reaction product of the photoreactive compound.

10. A process according to claim 1 in which the light-sensitive film is selectively exposed to cause a difference in the concentration of the reaction product of the photoreactive compound between the exposed area and the unexposed area, thereby causing an osmosis phenomenon to occur at a boundary of the exposed area and the unexposed area which acts to diminish a difference in a concentration of the reaction product, thus changing the thickness of the light-sensitive film.

11. A process according to claim 1 in which the light-sensitive film is selectively exposed to form a reaction product of the photoreactive compound, and the reaction product is swollen by an absorption of compounds which are also contained in the film, thereby varying the configuration of the film.

12. A process according to claim 11 in which the compounds to be absorbed by the reaction product are identical with the photoreactive compounds.

13. A process according to claim 1 in which the light-sensitive film formed on the substrate contains a solvent which is removed from the film during or after the exposure step.

14. A process according to claim 13 in which the solvent is 1,4-dioxane or a solvent having an evaporation pressure lower than that of 1,4-dioxane at an exposure temperature.

15. A process according to claim 1 in which the optical element is a microlens.

16. A process according to claim 15 in which the microlens is a convex lens.

17. A process according to claim 15 in which the microlens is a concave lens.

18. A process according to claim 15 in which the microlens is a distributed index lens.

19. A process according to claim 15 in which the microlens is a Fresnel lens.

20. A process according to claim 1 in which the optical element is a gradient thickness film.

21. A process according to claim 20 in which the gradient thickness film is an optical waveguide.

22. A process according to claim 20 in which the gradient thickness film is a diffraction grating.

23. A process according to claim 20 in which the gradient thickness film is a hologram.

24. An optical device which comprises a support having formed thereon in sequence a shadow mask and an optical element produced by forming on a substrate, in sequence, the shadow mask and a light-sensitive film containing at least a photoreactive compound which, when selectively exposed to radiation causes migration of unreacted photoreactive compound in unexposed areas to adjacent exposed areas, and selectively exposing the light-sensitive film to radiation passed through the shadow mask, which also acts as a photomask for producing the optical element from the light-sensitive film.

* * * * *

UNITED STATES PATENT AND TRADEMARK OFFICE
CERTIFICATE OF CORRECTION

PATENT NO. : 4,877,717
DATED : October 31, 1989
INVENTOR(S) : TOSHIHIRO SUZUKI et al.

It is certified that error appears in the above-identified patent and that said Letters Patent is hereby corrected as shown below:

```
Col  1, line 25, "difraction" should be --diffraction--.
Col. 2, line 13, "thee" should be --these--;
        line 32, "mass" should be --mass- --;
        line 45, "photo-reactive" should be
                 --photoreactive--.
Col. 4, line 22, "photo-reac-" should be --photoreac- --.
Col. 12, line 5, "LPD-P Namely," should be
                 --LPD-P. Namely,--.
Col. 13, line 53, "23 The" should be --23. The--.
Col. 14, line 22, "expanded In" should be --expanded. In--;
         line 32, "invention As" should be --invention.
                  As--;
         line 34, "pattern After" should be --pattern.
                  After--;
         line 41, "invention," should be --invention.--;
         line 66, "film Further," should be --film.
                  Further,--.
Col. 15, line  7, "properties" should be --properties.--;
         line 43, "temperature" should be --temperature.--;
         line 68, "solvents These" should be --solvents.
                  These--.
Col. 16, line  6, "elements Upon" should be --elements.
                  Upon--;
         line 15, "obtained Accordingly," should be
                  --obtained. Accordingly,--;
         line 17, "area Under" should be --area. Under--;
         line 45, "sure" should be --sure.--.
Col. 17, line 35, "membrane" should be --membrane.--;
         line 38, "M When" should be --M. When--;
         line 48, "area 4." should be --area 45--.
```

UNITED STATES PATENT AND TRADEMARK OFFICE
CERTIFICATE OF CORRECTION

PATENT NO. : 4,877,717

DATED : October 31, 1989

INVENTOR(S) : TOSHIHIRO SUZUKI et al.

It is certified that error appears in the above-identified patent and that said Letters Patent is hereby corrected as shown below:

Col. 18, line 19, "photo-reactive" should be --photoreactive--.

Signed and Sealed this

Eighth Day of January, 1991

Attest:

HARRY F. MANBECK, JR.

*Attesting Officer*     *Commissioner of Patents and Trademarks*